(12) United States Patent
Williams

(10) Patent No.: US 7,225,848 B2
(45) Date of Patent: Jun. 5, 2007

(54) FILM APPLICATOR TOOL WITH ARCUATE EDGES

(76) Inventor: Robert D Williams, 7530 S. Mt. Owen, Littleton, CO (US) 80127

(*) Notice: Subject to any disclaimer, the term of this patent is extended or adjusted under 35 U.S.C. 154(b) by 0 days.

(21) Appl. No.: 11/007,791

(22) Filed: Dec. 7, 2004

(65) Prior Publication Data
US 2006/0118246 A1    Jun. 8, 2006

(51) Int. Cl.
B32B 37/00 (2006.01)

(52) U.S. Cl. .................. 156/574; 156/71; 156/579
(58) Field of Classification Search .............. 156/71, 156/574, 579, 580; 425/458
See application file for complete search history.

(56) References Cited

U.S. PATENT DOCUMENTS

| | | | |
|---|---|---|---|
| 1,388,282 A | 8/1921 | Meredith | |
| 2,046,599 A | 7/1936 | Andrews | |
| 2,261,063 A | 10/1941 | Joyce | |
| 2,262,316 A | 11/1941 | Brugman | |
| 2,630,591 A | * 3/1953 | Smith | 15/105 |
| 3,821,828 A | 7/1974 | Pearson | |
| 4,567,616 A | * 2/1986 | Lyons | 7/105 |
| 4,784,598 A | 11/1988 | Kranz et al. | |
| 4,919,604 A | 4/1990 | Wilson | |
| D332,160 S | 12/1992 | Kuzma | |
| D364,719 S | 11/1995 | Crawford | |
| 5,475,199 A | 12/1995 | Buchanan | |
| D392,078 S | 3/1998 | Courts | |
| D402,514 S | * 12/1998 | Killins | D8/16 |
| D410,309 S | 5/1999 | Schmidt | |
| D412,230 S | 7/1999 | Schmidt | |

* cited by examiner

*Primary Examiner*—James Sells
(74) *Attorney, Agent, or Firm*—James K. Poole, Esq.

(57) ABSTRACT

Film applicator tools are provided which have at least two arcuate edges which are sufficiently flexible and resilient to permit application of adhesive films to smooth surfaces without leaving air bubbles, creases or other defects. The tools are molded of polymeric materials which have hardness values effective to permit the application of smooth and uniform pressure without tearing or abrading the films.

19 Claims, 6 Drawing Sheets

FILM APPLICATOR TOOL WITH ARCUATE EDGES

BACKGROUND OF THE INVENTION

1. Field of the Invention

The present invention pertains to tools for applying films to smooth surfaces, e.g. adhesive films to glass surfaces, in particular solar films for automotive windows.

2. Discussion of Relevant Art

Various types of films for covering or altering many types of surfaces have been used for many years. Wallpaper and other wallcovering materials such as self-adhesive films or films which adhere to surfaces through static electrical effects are one category. An increasing variety of films are being used to decorate or alter the light transmission properties of glass surfaces, flat and curved, residential/commercial through auto safety glazing. Some of these films are used to "darken" the glass by reducing light transmission; others affect work or living space environments by controlling heat gain and reducing solar radiation-caused fading, while other films may serve additional functions of enhancing safety and security, much as safety glass auto windshields prevent shattering. The application of any of these films can be difficult, and is a laborintensive, tedious process, which may explain why "paperhangers" are cited as ultimate examples of busy persons. Common problems include the formation of bubbles or folds in the films during application and ripping or otherwise damaging the films. The application of adhesive films poses the problem of applying them smoothly to the surface to be covered and trimming off any excess material before the adhesive sets. Application to auto glass surfaces, which can be curved convexly or concavely, even including compound curvatures, can be particularly difficult, requiring a significant amount of training for workers in this industry. When installing a film onto a concave surface, such as the inside surface of a car window, common problems reside in the fact that the technician is applying a flat film to a curved surface. The inherent tension on the film to conform to the curved surface of the glass promotes the formation of bubbles or fold-fingers in the films during application. Additionally, the technician must remain cognizant of the relative fragility of the medium and use care not to cause any ripping, creasing, scratching or other damage to the films. The application of adhesive films poses the problem of applying them smoothly to the surface to be covered and trimming off any excess material before the adhesive sets.

Squeegees, rollers and similar tools can be used in applying many of the films discussed above, but no ideal tool appears to be available. Problems persist in attaining the goal of smooth application of films to the surfaces requiring them, without involving the problems discussed above. A number of patents have been reviewed which are directed to squeegees, scrapers and the like.

Design Pat. No. 332,160 discloses a triangular squeegee with straight edges which is thicker in the middle and symmetric, the opposite sides being mirror images.

Design Pat. No. 364,719 discloses a roughly triangular cleaning tool with two rounded corners, a raised central portion and a generally flat bottom.

Other patents uncovered during the search which may also be of some interest, include the following:

Design Pat. No. 392,078 discloses an auto window scraper with a curved, narrow working edge and a symmetric profile.

Design Pat. No. 410,309 discloses a scraping tool having five edges, one of them "arcuate" (convexly curved), a raised central portion and a flat bottom.

Design Pat. No. 261,601 discloses a pan cleaner with both straight and curved edges, a raised central portion and a flat bottom.

U.S. Pat. No. 1,388,282 discloses a generally triangular cooking vessel wipe having two straight edges and one rounded edge with a thickened central portion and a symmetric cross section. The article is molded of non-porous rubber, and the thickened center is designed to provide "the degree of stiffness necessary".

U.S. Pat. No. 2,262,316 discloses a culinary scraper with celluloid blades having curved or straight edges and a removable handle.

U.S. Pat. No. 3,821,828 discloses a putty application tool with a curved edge formed by intersecting chamfered surfaces. The material is unspecified.

U.S. Pat. No. 4,784,598 discloses a drywall tool with one curved edge and a handle on top. According to the final paragraphs of column 3, the tool is made of a resilient, flexible material selected for a particular hardness or stiffness. The operation of the tool with its tapered edge is shown in FIG. 7.

U.S. Pat. No. 4,919,604 discloses a finishing tool having an arcuate blade with a central spine and a handle. The blade has a tapered, deformable edge and is flat on the bottom. Its flex properties are described in column 3.

U.S. Pat. No. 5,475,199 discloses a heater for sealing thick plastic films, having a roughly triangular shape like a flatiron.

U.S. Pat. No. 2,261,063 discloses a conventional putty knife with a handle.

U.S. Pat. No. 2,046,599 discloses a scraper with both straight and curved edges, a symmetric cross section and an angled handle.

Although a variety of tools and devices are available for the application of films to various surfaces, in particular for the application of films to glass surfaces such as automotive windows, problems persist in successfully applying such films to curved auto windows without tearing or otherwise damaging the films or leaving bubbles, creases or other defects in the films once applied and adhered to the windows.

SUMMARY OF THE INVENTION

It is an object of the present invention to provide tools which are effective in the smooth application of a variety of films to flat or curved surfaces without damaging the films. A particular object of the invention is tools for the application of films, especially adhesive films, to glass surfaces, particularly curved auto windows, without damaging the films or leaving any air bubbles, creases or defects in the applied films. A further object of the invention is to provide tools with arcuate edges having sufficient flexibility to apply such films while eliminating air bubbles and the like. Another object of the invention is to provide such tools which are molded of polymeric materials which are sufficiently flexible and resilient to provide a flexible edge to apply films, and soft enough to prevent tearing or abrading the films during application. A further object of the invention is to mold such tools in a bilaterally symmetric form which tapers uniformly on each surface from a thicker central portion to an edge which is sufficiently flexible to effectively apply the films discussed above. Another object of the invention is to provide molded tools having flexible arcuate edges which are blunted to avoid cutting or scratching the films during application. Still another object of the invention is to provide tools with multiple arcuate edges of different radii of curvature, suitable for a variety of uses in film application. Certain of these objects are attained by the embodiments disclosed and claimed below.

In accordance with the present invention, a tool for the application of films, especially adhesive films, is provided which has at least one arcuate edge having sufficient flexibility and resiliency and a quality of films to smooth surfaces (including those which are convexly or concavely curved) without leaving air bubbles, creases, damage to the films or other defects. The tool preferably has from two to four arcuate edges having different radii of curvature, and at least one narrow, blunted point or tip for working in close quarters. The tool can also have at least one straight edge. The desired resiliency is attained by molding the tool to taper uniformly from a central thicker portion to the arcuate edges, preferably by molding to provide two essentially identical surfaces (i.e., with bilateral symmetry), and with the arcuate edges slightly blunted to prevent cutting the films during application. The material of which the tool is molded has a degree of hardness sufficient to apply pressure smoothly and uniformly to the films, but not hard enough to tear, abrade or otherwise damage the films. Such qualities and parameters are quantified below. A preferred embodiment of the invention has three arcuate edges having at least two different radii of curvature and a generally triangular shape having a blunt end and a narrower or somewhat pointed end, tapering uniformly from a thicker central portion to the arcuate edges, which are slightly blunted.

BRIEF DESCRIPTION OF THE DRAWINGS

The objects and advantages of the present invention will be further understood by perusal of the following detailed description, the appended claims, and the drawings, in which:

DETAILED DESCRIPTION OF PREFERRED EMBODIMENTS

Firstly, although the embodiment described above is bilaterally symmetric, it may be described as having upper and lower surfaces or first and second surfaces, even though these surfaces may be essentially identical. Where used, the expression "and/or" is used in the sense of A, B or A+B. The term "arcuate" is used to mean an edge or contour having a uniform radius of convex curvature.

Figure 1:
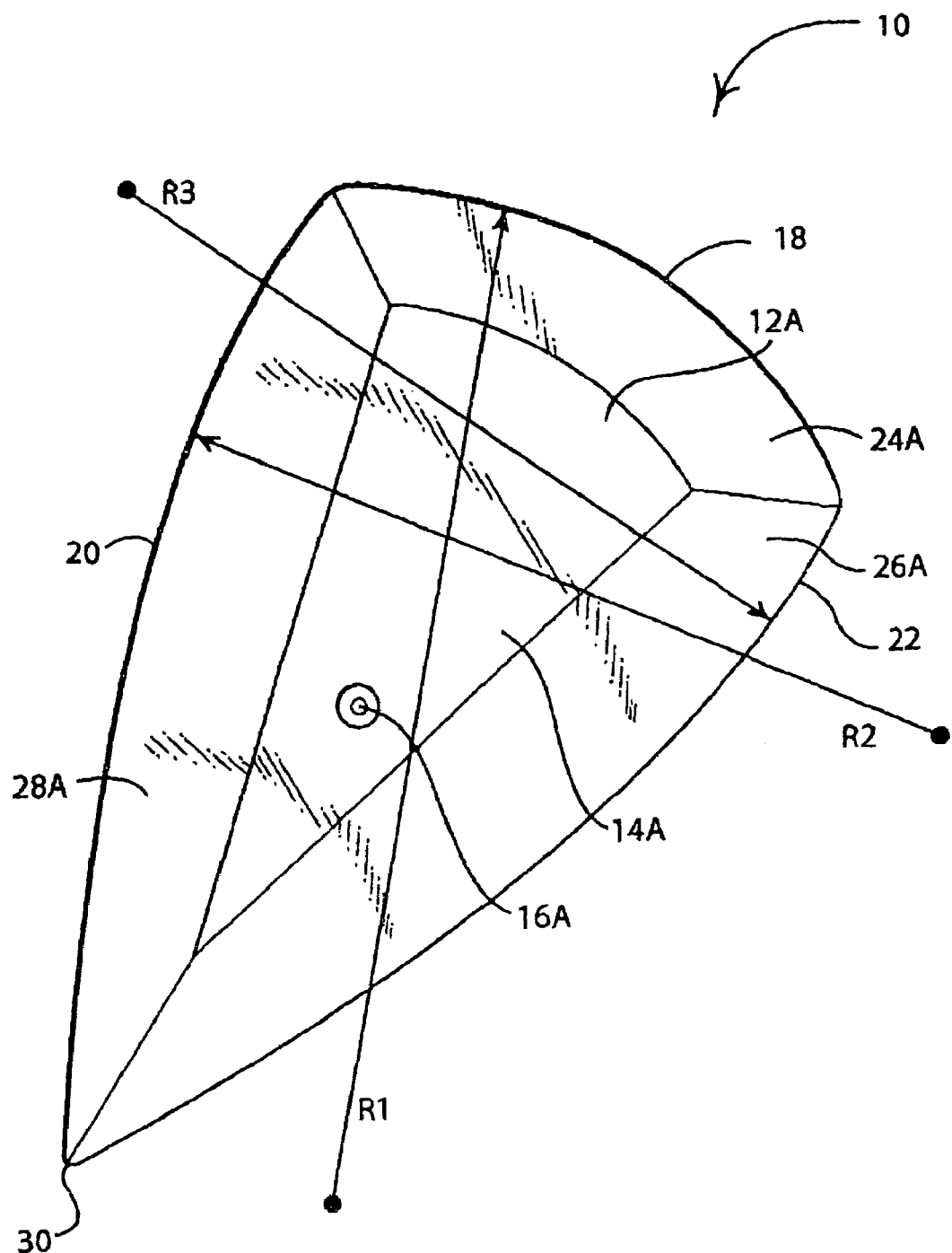
FIG. 1 is a plan view of an applicator of the invention having a roughly triangular form and three arcuate edges.

Turning now to the drawings, FIG. 1 shows a generally triangular applicator tool 10 having a first side 12A and a second side (not visible here) 12B. Each side has a raised or thicker central portion 14A (and 14B, not visible here). Mold marks 16A and 16B are left on the tool by the preferred dual cavity molding process, which easily produces a tool having bilateral symmetry. Arcuate edges 18, 20 and 22 have at least two different radii of curvature R1, R2 and R3, respectively, as indicated in FIG. 1. Depending upon the type of application, these radii can range from about to about inches. In some cases, convexly-curved edges of non-uniform or variable radii can be used. Optionally, the tool can be provided with at least one straight edge, shown in FIG. 6 as 22A. From the raised central portions 14A and 14B, the tool tapers gradually over tapered portions 24A, 26A, 28A on one side and 24B, 26B and 28B on the other side (not visible here). Generally, these portions of the tool taper in a straight line as shown, but could taper in a concavely (26A', 26B') or convexly (26A", 26B") curved manner to produce desired flex properties, as illustrated in FIGS. 5A and 5B. As shown in the latter (and other) figures, the edges 18, 20 and 22 have a finite width rather than being sharp enough to cut the film being applied. The width of the edges can be in the range of from about 0.01 to about 0.1 inch, preferably in the range of from about 0.02 about 0.1 inch, preferably in the range of from about 0.02 to about 0.08 inch, and for the application of auto window tinting films, about 0.03 inch. The edges can be relatively flat and/or rounded in contour, depending upon the intended application.

The tool is molded of a suitable polymeric material which will produce the desired flex properties of the arcuate working edges and have a degree of hardness which avoids damage to the film, as discussed above. The tool is preferably injection molded in a dual-cavity mold to provide bilateral symmetry. Since the relatively thin edges of the tool generally will not accommodate tab gates for the injection of the molten resin, the molds are gated in the center of both cavities, leaving a sprue 16A and sprue puller 16B on the finished tool. The arcuate edges can have a flex modulus value in the range of from about 8000 to about 220,000 psi, preferably from about 20,000 to about 180,000 psi, and most preferably from about 80,000 to about 120,000 psi, for use in applying typical darkening window films to auto windows. The different arcuate edges can have different flex values within these ranges, and values at various points within these ranges can be selected for tools to be used in applying films of differing physical properties and/or thickness, to various types or surfaces. The hardness of the molded material, based upon Shore D Hardness values, can be in the range of from about 10 to about 80, from about 30 to about 60 or from about 12 to about 20, preferably from about 14 to about 18, and most preferably from about 15 to about 17.

Tools in accordance with the invention can be designed and produced to apply a wide variety of films, including adhesive and nonadhesive types, ranging in thickness from about 0.008 to about 0.03 inches. For example, in the area of auto window films, the thickness of conventional tinting films can range from about 0.008 to about 0.03 inches, while films up to about 0.03 inches, preferably 0.024 inches, can be used to provide resistance to shattering as well as tinting.

The tools can be molded of any suitable thermoplastic or thermosetting polymer, including thermoplastic polyolefins having densities in the range of from about 0.86 to about 1.05 g/mL, such as various types of polyethylenes, polypropylenes (including copolymers comprising monomers having 2 carbons or more than three carbons) (extending to octane monomers), thermoplastic polyesters, including those based upon saturated poyester resins; polyurethanes, melt-processible rubbers and silicone polymers having similar properties. Polyolefin ketones can be included. Polybutadiene and styrene-butadiene copolymers such as the commercial Krayton(R) rubbers can be used. ABS (acrylonitrile-styrene-butadiene) polymers are also suitable, especially at low CN levels. Polyethylenes can include a variety of comonomers, comprising olefins and saturated hydrocarbons from polypropylene up to about octanes, where the use of hexane and octane comonomers added to a Ziegler catalyst in a loop reactor yield LLDPE (linear low density polyethylene) and higher density polyolefins with high elongation and ESCR (environmental stress crack resistance). Other suitable comonomers inlcude fatty acid esters such as vinyl acetate (at less than about 29 mole percent) and acrylic acid and ester derivatives such as n-butyl acrylate. Polybutene, polybutylene and butyl rubber (polyisobutylene containing small amounts of isoprene) are also suitable. Thermoplastic polymers are presently preferred due to the relative ease of injection molding with same. Plasticized thermoplastics such as polyvinyl chloride and ABS polymers can be used.

In addition to thermoplastic polymers, some thermosetting or chain extending polymers can be used. For example, polyurethanes, based upon either polyesters or polyethers, can be used. Plasticized epoxy resins and silicone rubbers can also be used. Vulcanized rubbers such as used for auto tires can be used, as well as thermoplastic vulcanates, and thermoplastic rubbers filled with pre-crosslinked rubbers. HDPE (high density polyethylene) and LDPE (low density polyethylene) can be crosslinked three-dimensionally with organic peroxides, especially if they contain butylene comonomers.

Those skilled in the molding arts and familiar with the requirements of tools for particular applications will be able to choose a variety of suitable polymeric materials for molding the tools of the invention, basing the choices upon economics as well as the required physical properties of the finished tools.

The radii of curvature of the arcuate working edges can be in the range of from about three inches to about 40 inches, preferably from about four inches to about 30 inches, and most preferably from about six inches to about 25 inches for use in the application of adhesive films to convexly-curved auto windows.

Figure 2:
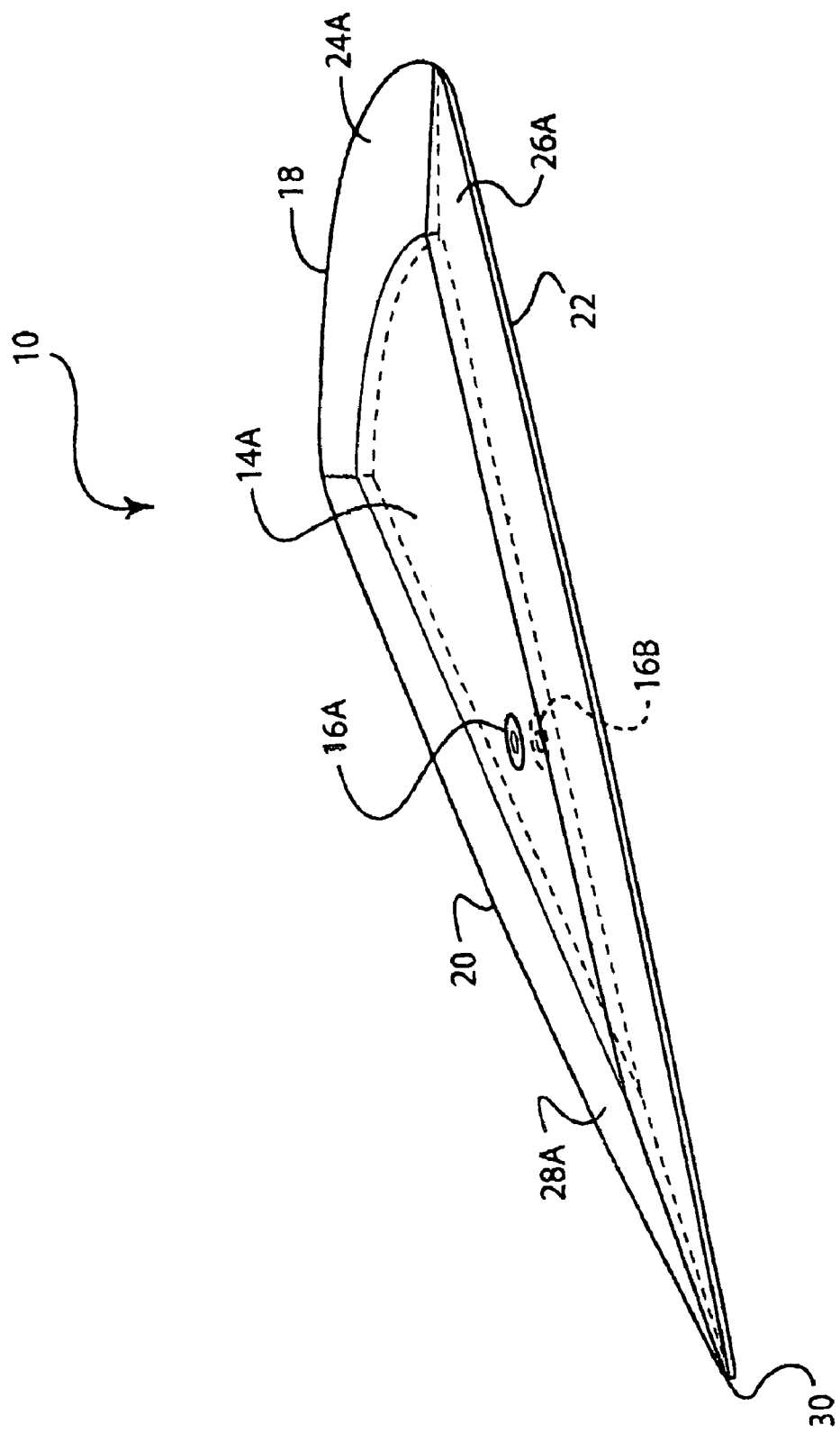
FIG. 2 is a side perspective view of the applicator of FIG.

FIG. 2 shows the same features as FIG. 1, with mold mark 16B and the countours of raised portion 14B on the underside shown in dotted lines. The edge 22 can be seen to have a finite width rather than a cutting edge. A narrow or almost pointed tip 30 is visible in both FIGS. 1 and 2. This tip is useful for gaining access to narrow spaces where the film must be smoothed during application, and for holding the film in place during trimming.

Figure 3:
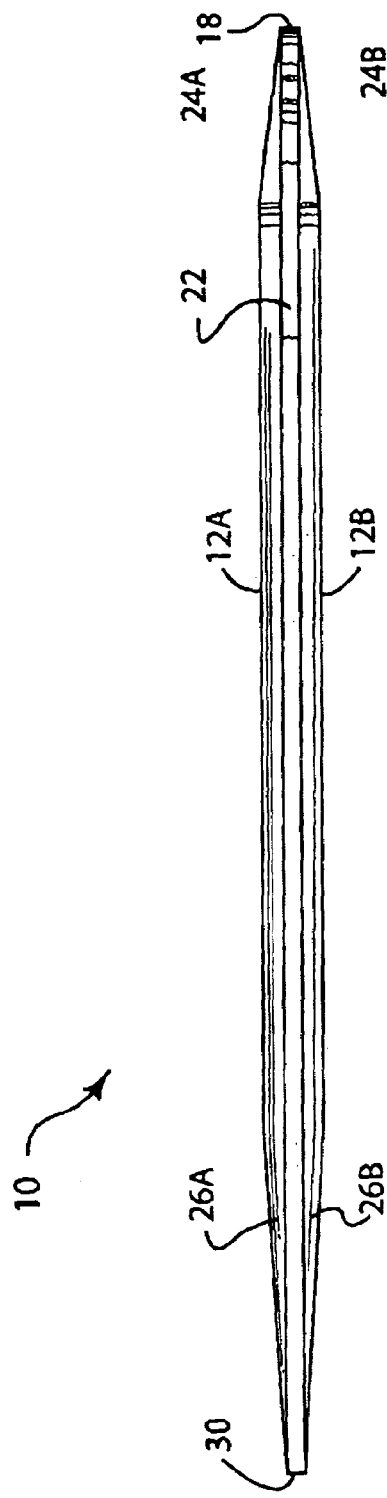
FIG. 3 is a side view of the applicator.
Figure 4:
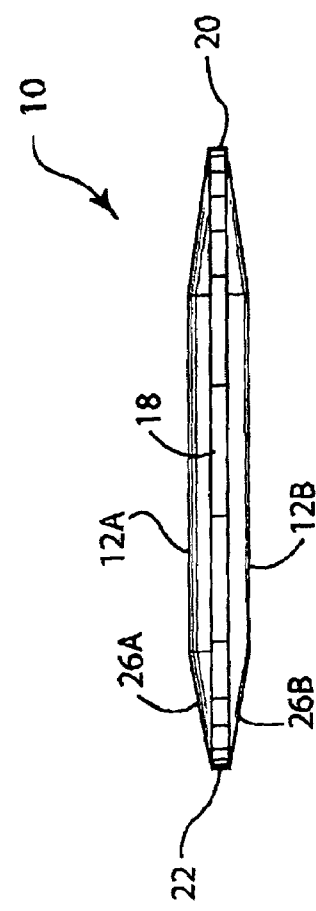
FIG. 4 is an end view of the blunt end of the applicator.

FIG. 3 is a side view of tool 10 with tip 30 at the left, showing the finite widths of edges 18 and 22 as well as the relative tapering longitudinally (from edge 18 to tip 30) from raised central portions 12A and 12B to those edges. FIG. 4 is an end view from the "blunt" end (edge 18), again illustrating the finite width of the edges 18, 20 and 22 and the degree of tapering in the lateral direction (between the center and longer edges 20 and 22).

Figure 5:
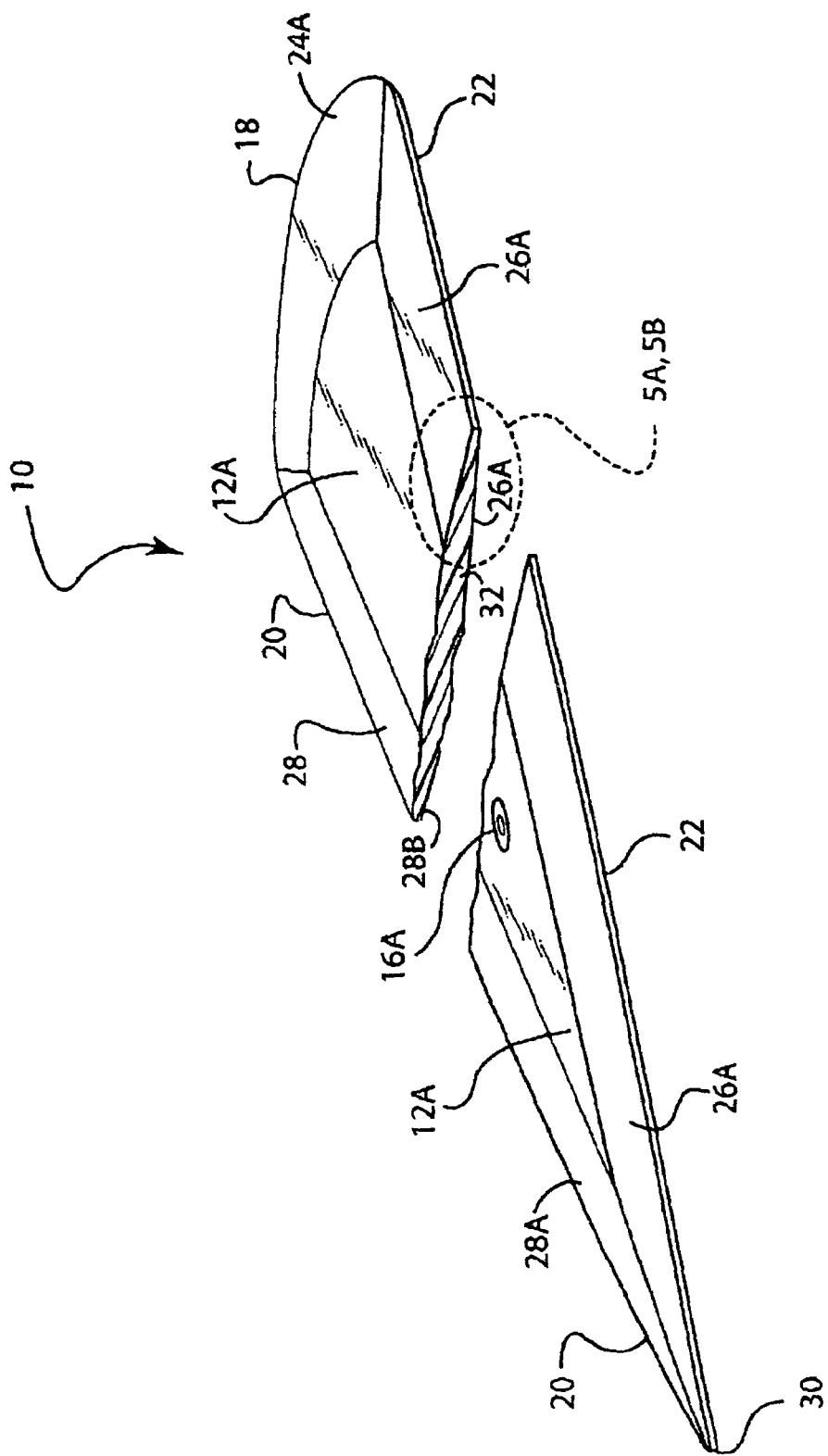
FIG. 5 is a cutaway side perspective view of the applicator showing the central profile of the item.
Figure 5A:
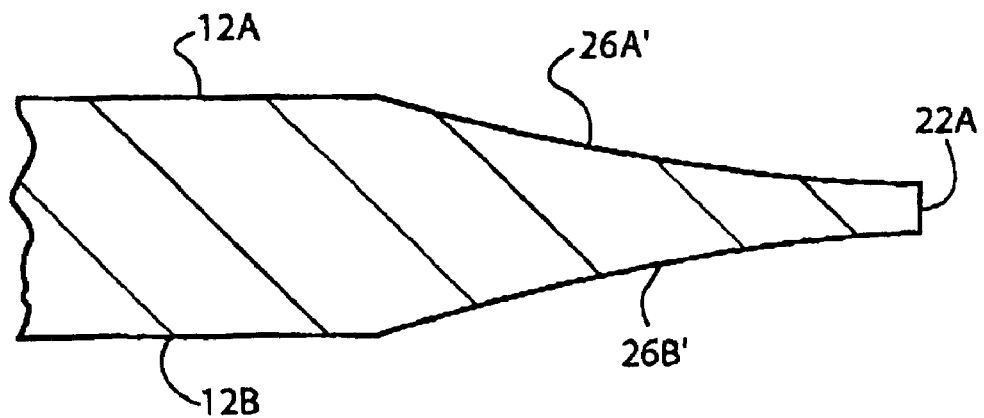
FIG. 5A is a detail cutaway view of the applicator edge.
Figure 5B:
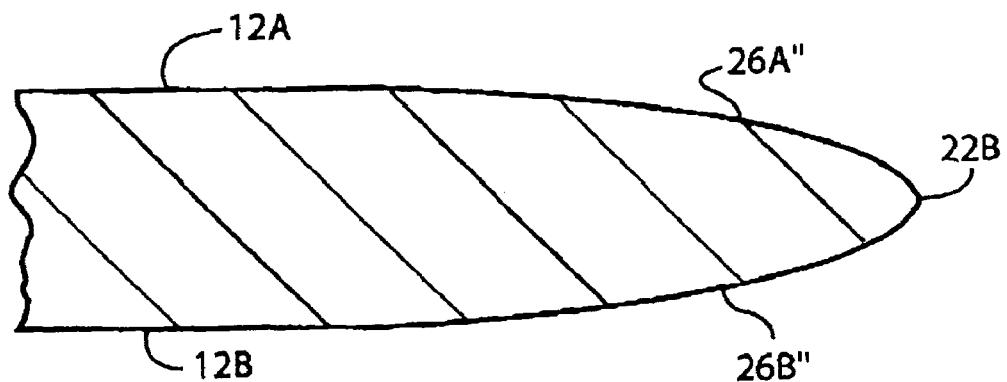
FIG. 5B is a second detail drawing view of the applicator.

FIG. 5 illustrates the cross section 32 of the central portion of the tool through a broken sectional view. FIGS. 5A and 5B illustrate variations on the edge shape and tapering from the central portion of the tool. In FIG. 5A, the tool tapers to edge 22A in a concavely curved fashion (26A' and 26B') rather than in a linear manner, and edge 22A is relatively flat. This type of edge tends to remove more water when used with wet films. In FIG. 5B, the tool tapers via convexly curved surfaces 26A" and 26B" to a rounded edge 22B. While the tools presently produced employ a linear taper and slightly rounded edges, any combination of the contours discussed above can be used to provide tools having the proper flex properties and edges which will produce the desired results without damaging the films.

Figure 6:
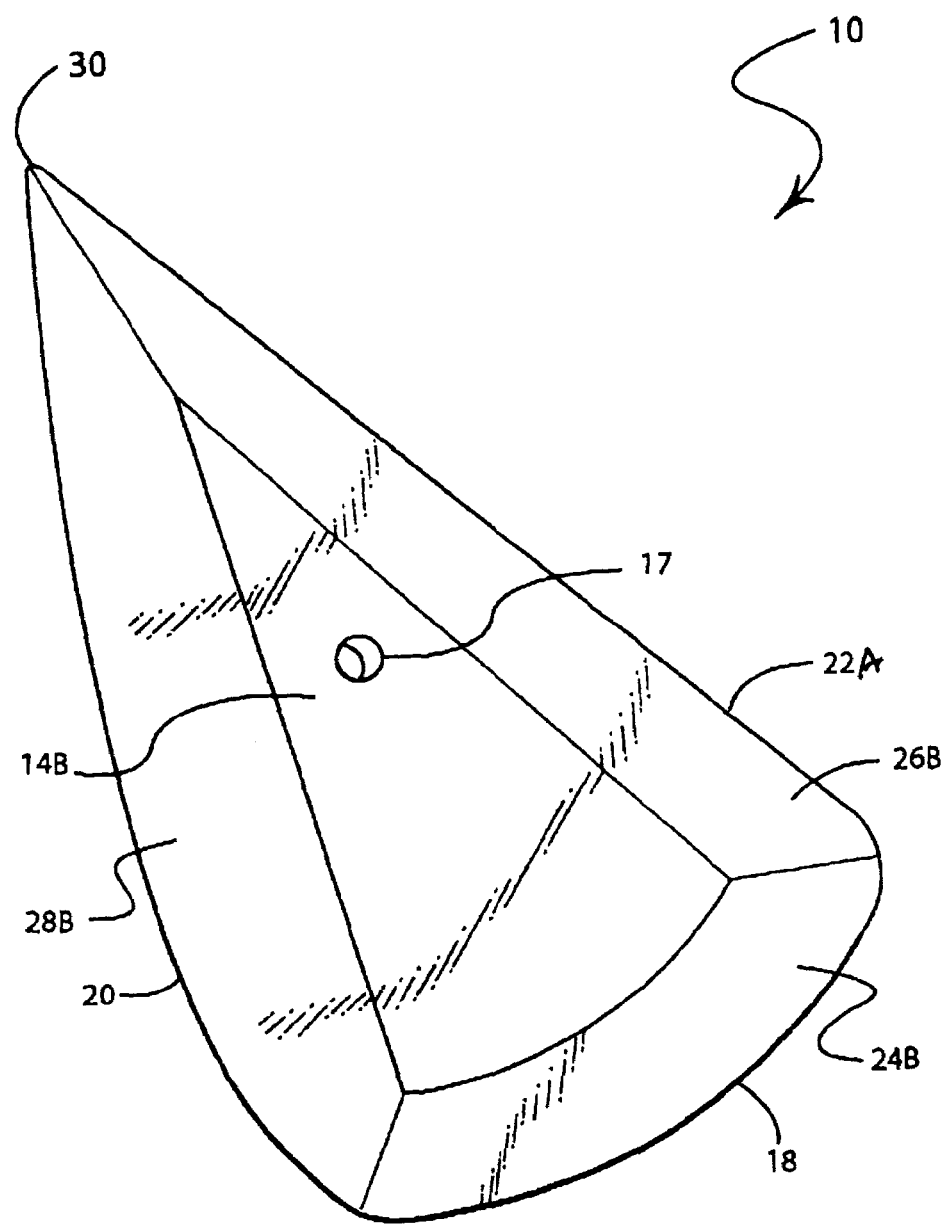
FIG. 6 is a plan view of the reverse side of the applicator of FIG. 1.

FIG. 6 shows the reverse side of the tool, revealing the symmetric features hidden in FIGS. 1 and 2. Also, in FIG. 6 alone, edge 22A is shown as straight rather than arcuate, representing the utility of having at least one straight edge in some tools. The portion of the tool labelled as mold marks 16A and 16B has been drilled or punched out to produce a through hole 17, which can be used to hang the tool up for storage and/or fitted with temporary or permanent handles (not shown) to facilitate handling and use of the tool.

Various changes and modifications to the presently preferred embodiments of the invention will be apparent to those skilled in the art. Such changes and modifications may be made without departing from the spirit and scope of the present invention and without diminishing its attendant advantages. Therefore, the appended claims are intended to cover such changes and modifications, and are the sole limits on the scope of the invention.

I claim:

1. A film applicator tool which is bilaterally symmetric top to bottom and is formed with a thicker central portion which tapers bilaterally uniformly to at least two arcuate edges, each having radii of curvature in the range of from about 3 to about 40 inches, which are flexible and resilient enough to apply flexible films to smooth surfaces without leaving air bubbles, creases or other defects, said arcuate edges being slightly blunted and having a degree of hardness which avoids cutting or scratching said films, said tool further comprising a rounded, narrow tip which includes an acute angle.

2. The film applicator tool of claim 1 which is adapted for the application of adhesive automotive window films.

3. The film applicator tool of claim 1 wherein said at least two arcuate edges have different radii of curvature.

4. The film applicator of claim 1 which has at least one straight edge.

5. The film applicator tool of claim 2 which has three arcuate edges, wherein each of said arcuate edges has a radius of curvature in the range of from about three to about 25 inches.

6. The film applicator tool of claim 1 which is dual-cavity injection molded of a polymeric material, using sprue gates in the center or each cavity, to provide bilateral symmetry top-to-bottom.

7. The film applicator tool of claim 6 wherein said polymeric material is selected from the group consisting of polyolefins, polyesters, polyurethanes, melt-processible rubbers and silicone polymers.

8. The film applicator tool of claim 6 which is molded of polymeric material selected from the group consisting of polyethylenes, polypropylenes, thermoplastic polyurethanes and thermoplastic polyesters.

9. The film applicator tool of claim 1 wherein each of said at least two arcuate edges has a flex modulus value in the range of from about 8000 to about 220,000 psi.

10. The film applicator tool of claim 9 wherein each of said at least two arcuate edges has a flex modulus value in the range of from about 20,000 to about 180,000.

11. The film applicator tool of claim 1 wherein each of said at least two arcuate edges has a width in the range of from about 0.01 to about 0.1 inches.

12. A film applicator tool having a substantially triangular form having bilateral symmetry top-to-bottom, three arcuate edges, each of said arcuate edges having a radius of curvature in the range of from about 3 to about 40 inches, and a narrow, rounded tip formed by the intersection of two of said arcuate edges, the tool tapering bilaterally uniformly from a thicker central portion to each of said edges, each edge being flexible and resilient enough to apply adhesive films to curved automotive windows without leaving air bubbles, creases or other defects, said tool being molded of a polymeric material having a Shore D hardness value effective to provide smooth, uniform pressure to said films without tearing, abrading or damaging said films, each of said arcuate edges being blunted sufficiently to avoid cutting or scratching said films.

13. The film applicator tool of claim 12 wherein each of said arcuate edges have flex modulus values in the range of from about 20,000 to about 180,000 psi.

14. The film applicator tool of claim 12 which is dual-cavity injection molded of a thermoplastic polyester or a thermoplastic polyurethane.

15. The film applicator tool of claim 12 wherein said narrow, rounded tip encompasses an acute angle for access to restricted work spaces.

16. The film applicator tool of claim 1 wherein said rounded, narrow tip encompasses an acute angle of less than about 45 degrees.

17. A film applicator tool having a substantially triangular form having bilateral symmetry top-to-bottom, three arcuate edges, the two longest edges having the same radii of curvature and the shorter edge having a different radius of curvature, all said radii of curvature being, in the range of from about 3 to about 25 inches, and a narrow, rounded tip, the tool tapering bilaterally uniformly from a thicker central portion to each of said edges, each edge being flexible and resilient enough to apply adhesive automotive window films to curved automotive windows without leaving air bubbles, creases or other defects, said tool being molded of a thermoplastic polyester or thermoplastic polyurethane and having a Shore D hardness value effective to provide a smooth, uniform pressure to said films during application without tearing, abrading or damaging said films, each of said arcuate edges being blunted sufficiently to avoid cutting or scratching said films.

18. The film application tool of claim 17, further comprising a small through hole penetrating from top to bottom in the central portion thereof.

19. The film application tool of claim 17, wherein said shorter arcuate edge has a shorter radius of curvature than the two longest edges.

* * * * *